(12) United States Patent
Hosoi et al.

(10) Patent No.: US 8,292,738 B2
(45) Date of Patent: Oct. 23, 2012

(54) INFORMATION PROCESSING SYSTEM AND ATTACHMENT DEVICE

(75) Inventors: Kazuhiro Hosoi, Kyoto (JP); Yasuyuki Shimohata, Kyoto (JP); Toru Yamashita, Kyoto (JP); Ryoji Kuroda, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 179 days.

(21) Appl. No.: 12/821,671

(22) Filed: Jun. 23, 2010

(65) Prior Publication Data

US 2011/0263327 A1    Oct. 27, 2011

(30) Foreign Application Priority Data

Apr. 22, 2010   (JP) .................................. 2010-098575

(51) Int. Cl.
  *A63F 9/24*  (2006.01)
(52) U.S. Cl. ............................... 463/36; 463/31; 463/39
(58) Field of Classification Search .................... 463/36, 463/31, 29, 43
  See application file for complete search history.

(56) References Cited

U.S. PATENT DOCUMENTS

| | | | | |
|---|---|---|---|---|
| 2008/0064500 | A1* | 3/2008 | Satsukawa et al. | 463/37 |
| 2009/0258704 | A1* | 10/2009 | Asami | 463/36 |
| 2010/0048301 | A1* | 2/2010 | Miller, IV | 463/39 |
| 2010/0087253 | A1* | 4/2010 | Yang | 463/37 |
| 2010/0105475 | A1* | 4/2010 | Mikhailov et al. | 463/33 |
| 2010/0113153 | A1* | 5/2010 | Yen et al. | 463/37 |
| 2010/0248822 | A1* | 9/2010 | Migos et al. | 463/29 |
| 2011/0118032 | A1* | 5/2011 | Zalewski | 463/39 |
| 2011/0124410 | A1* | 5/2011 | Mao et al. | 463/31 |

FOREIGN PATENT DOCUMENTS

JP    2007-83024    4/2007

* cited by examiner

*Primary Examiner* — Masud Ahmed
(74) *Attorney, Agent, or Firm* — Nixon & Vanderhye P.C.

(57) ABSTRACT

A game system as an information processing system includes a game apparatus and a controller, and the controller is attached with an attachment device. In a case that a slit plate of the attachment device is removed, the controller detects positions of high-intensity parts as to infrared ray output from markers provided on a monitor, and designates coordinates on the monitor screen thereby. Alternatively, in a case that the slit plate is loaded, when a card printed and so forth with a dot pattern is slid along a guide groove of the attachment device, a position of a high-intensity part of a plurality of dots to which infrared ray is irradiated is detected, so that information processing based on the dot pattern is executed.

6 Claims, 11 Drawing Sheets

(A)

(B)

(A) WHEN CONTROLLER IS USED AS POINTING DEVICE (B) WHEN CONTROLLER IS USED AS PATTERN READER (A) DOT PATTERN (B) EXPLANATION OF DOT PATTERN (C) READ IMAGE OF DOT PATTERN (A) SLIT PLATE (HORIZONTALLY-LONG SLIT) 362

(B) SLIT PLATE (TWO SLITS) 362

INFORMATION PROCESSING SYSTEM AND ATTACHMENT DEVICE

CROSS REFERENCE OF RELATED APPLICATION

The disclosure of Japanese Patent Application No. 2010-98575 is incorporated herein by reference.

BACKGROUND OF THE INVENTION

1. Field of the Invention

The present invention relates to an information processing system and an attachment device. More specifically, the present invention relates to an information processing system and an attachment device by using an input device provided with an imaging device.

2. Description of the Related Art

One example of the related art is disclosed in Japanese Patent Application Laid-Open No. 2007-83024 [A63F 13/06, H01H 9/02] (Document 1) laid-open on Apr. 5, 2007. In the information processing system of the Document 1, infrared rays output from two LED modules arranged around a monitor are imaged by an imaging device of an imaged information arithmetic unit provided at the tip end of a controller. An image processing circuit of the imaged information arithmetic processing unit performs processing on the imaged image including the infrared rays to obtain positions and area information of the two LED modules as information of the high-intensity points. The data of the positions and the sizes of the high-intensity points are transmitted from the controller to the game machine, and they are received by the game machine. When a player moves the controller, the data of the positions and the sizes of the high-intensity points are changed, and therefore, by utilizing them, the game machine can fetch an operation signal in correspondence with a movement of the controller, and directly input coordinates and input a rotation within the screen.

However, in the information processing system in the Document 1, the controller provided with the imaging device is used only as a pointing device for directly inputting coordinates and inputting a rotation, and thus, there is a room for developing another usage.

SUMMARY OF THE INVENTION

Therefore, it is a primary object of the present invention to provide a novel information processing system and a novel attachment device.

Another object of the present invention is to provide an information processing system and an attachment device which can be used as a pattern reader.

A first invention is an information processing system having an input device, an attachment device provided to be attached to and detached from the input device, and an information processing apparatus to execute predetermined information processing by performing communications with the input device. The input device comprises an imaging device; a position calculator which calculates a position of a high-intensity part within an image imaged by the imaging device; and a transmitter which transmits data in relation to the position of at least the high-intensity part. The attachment device comprises a cover which covers the imaging device and has a slit of a predetermined width. Accordingly, the position calculator calculates the position of the high-intensity part within the image imaged through the slit. The information processing apparatus comprises a receiver which receives the data transmitted by the transmitter, and an executor which executes predetermined information processing on the basis of the data received by the receiver.

According to the first invention, by attaching the attachment device to the input device with the imaging device, the position of the high-intensity part within the image imaged through the slit is calculated, and on the basis of this, the information processing apparatus executes predetermined information processing, and therefore, it is possible to use the input device as a pattern reader which detects a position of the high-intensity part.

A second invention is according to the first invention, and the attachment device further comprises an illuminator which emits light toward an imaging direction of the imaging device. For example, by illuminating the information medium printed with a pattern which is arranged in an imaging direction, the predetermined pattern corresponds to a high-intensity part. Accordingly, if various information mediums are prepared, predetermined information processing corresponding to each of them is executed.

According to the second invention, if the various information mediums are prepared, the predetermined information processing corresponding thereto is executed, and therefore, it is possible to increase general versatility as a pattern reader.

A third invention is according to the first invention, and the attachment device further comprises a guide member extending in a width direction of the slit. Accordingly, if a card-shaped information medium is created, by sliding the information medium along the guide member, it is possible to detect a position of the high-intensity part according to the predetermined pattern.

According to the third invention, a guide member is provided, and therefore, it is possible to ensure a predetermined distance and securely slide an information medium like a card. Accordingly, it is possible to correctly detect the position of the high-intensity part.

A fourth invention is according to the first invention, and the attachment device is detachably provided with a plate member including the slit. If the plate member is removed, the input device attached with the attachment device is used as a normal input device.

According to the fourth invention, the plate member including the slit is detachably provided, and therefore, it is possible to selectively use the input device between normal usage and usage when the attachment device is attached without attachment and detachment of the attachment device itself.

A fifth invention is an attachment device to be attached to an input device having an imaging device. The attachment device comprises a plate member having a slit of a predetermined width; an illuminator which outputs an infrared ray in a direction intersecting with a surface of the plate member from outside of the plate member; and a guide member which extends in parallel with the plate member. For example, when the card printed with the dot pattern is slid along the guide member or inserted into the guide member, the dot pattern is made to high-intensity by the infrared ray from the illuminator. Furthermore, the position of the high-intensity part is detected from the imaged image imaged by the imaging device.

According to the fifth invention, by utilizing the attachment device, it is possible to use the input device with the imaging device as a pattern reader for detecting a position of a high-intensity part.

A sixth invention is according to the fifth invention, and further comprises a cover which is formed to cover the imaging device, the plate member and the illuminator.

According to the sixth invention, the cover is formed to cover the imaging device, the plate member and the illuminator, and therefore, it is possible to prevent a high-intensity part other than the high-intensity part included in the image imaged through the slit from being erroneously detected.

A seventh invention is the plate member and the cover which are blackened. That is, light from the illuminator is absorbed by the black of the plate member and the cover.

According to the seventh invention, the infrared ray from the illuminator is absorbed by the plate member and the cover, and therefore, it is possible to accurately detect only the position of the high-intensity part imaged through the slit.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
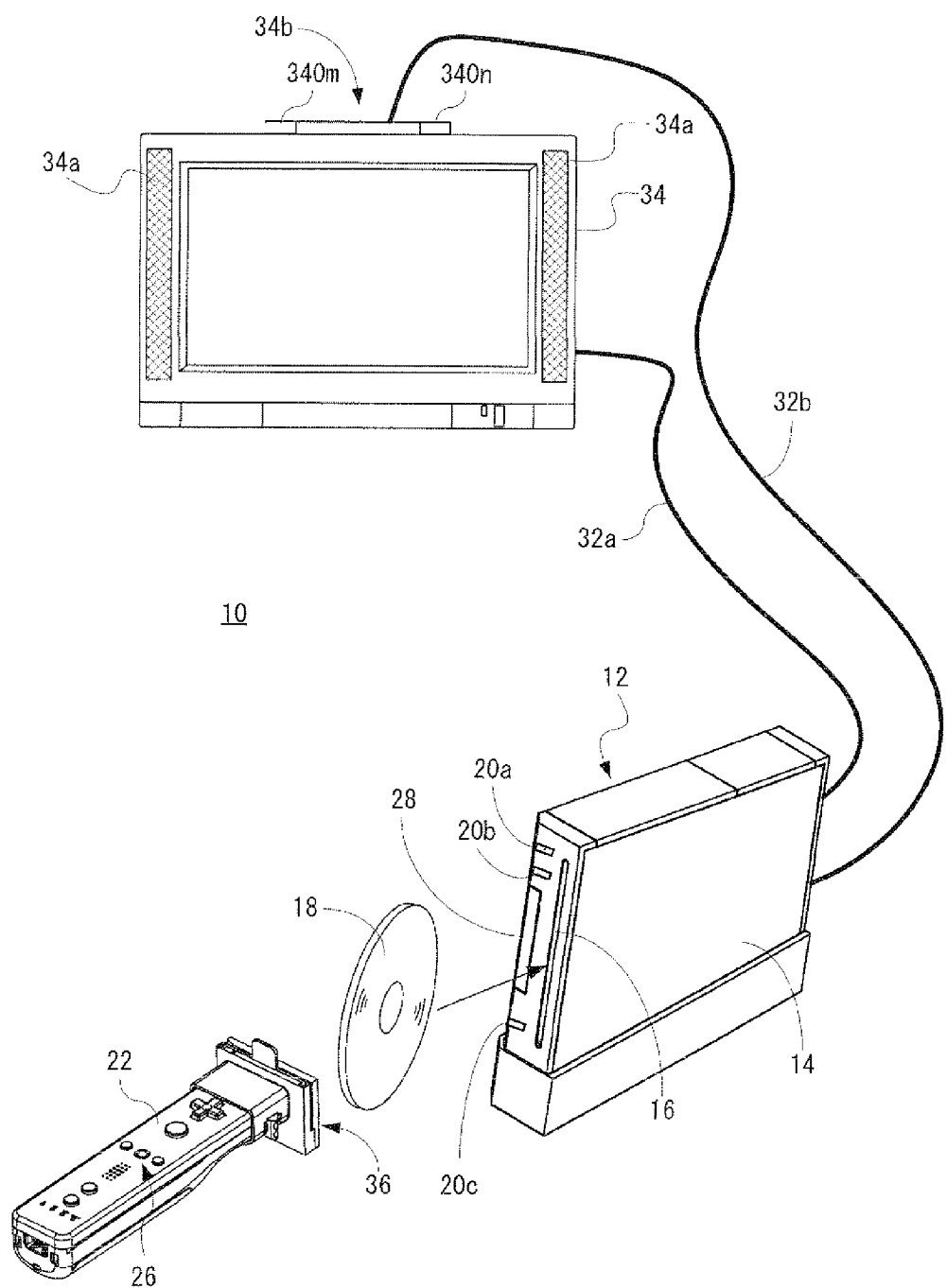
FIG. 1 is an illustrative view showing one embodiment a game system of the present invention.

Referring to FIG. 1, a game system 10 of one embodiment of an information processing system of the present invention includes a video game apparatus (hereinafter, simply referred to as "game apparatus") 12 and a controller 22. Although illustration is omitted, the game apparatus 12 of this embodiment is designed such that it can be connected to four controllers 22 at the maximum. Furthermore, the game apparatus 12 and each of the controllers 22 are wirelessly connected. The wireless communication is executed according to a Bluetooth (registered trademark) standard, for example, but may be executed by other standards such as infrared rays, a wireless LAN, etc. Alternatively, they may be connected by wire. Here, as shown in FIG. 1, the controller 22 is attached with an attachment device 36. The attachment device 36 can be attached to and detached from the controller 22.

The game apparatus 12 includes a roughly rectangular parallelepiped housing 14, and the housing 14 is furnished with a disk slot 16 on a front surface. An optical disk 18 as one example of an information storage medium storing a game program, etc. is inserted from the disk slot 16 to be loaded into a disk drive 54 (see FIG. 2) within the housing 14. Although omitted in the illustration, around the disk slot 16, an LED and a light guide plate are arranged so as to make the disk slot 16 light up and off or flash in response to various processing.

Furthermore, on a front surface of the housing 14 of the game apparatus 12, a power button 20a and a reset button 20b are provided at the upper part thereof, and an eject button 20c is provided below them. In addition, a connector cover for external memory card 28 is provided between the reset button 20b and the eject button 20c, and in the vicinity of the disk slot 16. Inside the connector cover for external memory card 28, a connector for external memory card 62 (see FIG. 2) is provided, through which an external memory card (hereinafter simply referred to as a "memory card") not shown is inserted. The memory card is employed for loading the game program, etc. read from the optical disk 18 to temporarily store it, storing (saving) game data (result data or proceeding data of the game) of the game played by means of the game system 10, and so forth. Here, storing the game data described above may be performed on an internal memory, such as a flash memory 44 (see FIG. 2) provided inside the game apparatus 12 in place of the memory card. Also, the memory card may be utilized as a backup memory of the internal memory. In addition, in the game apparatus 12, an application other than the game can be executed, and in such a case, data of the other application can be saved in the memory card.

It should be noted that a general-purpose SD card can be employed as a memory card, but other general-purpose memory cards, such as memory sticks, multimedia cards (registered trademark) can be employed.

Although is omitted in FIG. 1, the game apparatus 12 has an AV cable connector 58 (see FIG. 2) on the rear surface of the housing 14, and by utilizing the AV cable connector 58, a monitor 34 and a speaker 34a are connected to the game apparatus 12 through an AV cable 32a. The monitor 34 and the speaker 34a are typically a color television receiver, and through the AV cable 32a, a video signal from the game apparatus 12 is input to a video input terminal of the color television, and a sound signal from the game apparatus 12 is input to a sound input terminal thereof. Accordingly, a game image of a three-dimensional (3D) video game, for example, is displayed on the screen of the color television (monitor) 34, and stereo game sound, such as a game music, a sound effect, etc. is output from right and left speakers 34a. Around the monitor 34 (on the top side of the monitor 34, in this embodiment), a marker unit 34b including two infrared ray LEDs (markers) 340m and 340n is provided. The marker unit 34b is connected to the game apparatus 12 through a power source cable 32b. Accordingly, the marker unit 34b is supplied with power from the game apparatus 12. Thus, the markers 340m and 340n emit lights so as to output infrared rays ahead of the monitor 34.

Furthermore, the power of the game apparatus 12 is applied by means of a general AC adapter (not illustrated). The AC adapter is inserted into a standard wall socket for home use, and the game apparatus 12 transforms the house current (commercial power supply) to a low DC voltage signal suitable for driving. In another embodiment, a battery may be utilized as a power supply.

In the game system 10, a user or a player turns the power of the game apparatus 12 on for playing the game (or applications other than the game). Then, the user selects an appropriate optical disk 18 recording a program of a video game (or other applications the player wants to play), and loads the optical disk 18 into the disk drive 54 of the game apparatus 12. In response thereto, the game apparatus 12 starts to execute a video game or other applications on the basis of the program recorded in the optical disk 18. The user operates the controller 22 in order to apply an input to the game apparatus 12. For example, by operating any one of the operating buttons of the input means 26, a game or other application is started. Besides the operation performed on the input means 26, by moving the controller 22 itself in a state that the attached apparatus 36 is detached from the controller 22 or a slit plate 36b (to be described later) is removed from the attached apparatus 36, it is possible to move a moving image object (player object) in different directions or change the perspective of the user (camera position) in a three-dimensional game world. In addition, by reading the dot pattern (code) in a state that the attached apparatus 36 is attached, it is possible to perform predetermined information processing (game processing) according to the read dot pattern.

For example, as predetermined information processing (game processing), various processing is relevant, such as generating a game character based on a dot pattern, adding and changing an attribute of the game character, causing the game character to make an predetermined action, adding a map, displaying a facial image and private information of people, generating a character code, adding and changing a dictionary (word), etc. That is, the predetermined information processing is decided depending on a dot pattern and an application (information processing) to be executed in the game apparatus 12 as an information processing apparatus.

It should be noted that the video game and other application programs are stored (installed) in an internal memory (flash memory 42 (see FIG. 2)) of the game apparatus 12, and may be executed in the internal memory. In such a case, a program stored in a storage medium like an optical disk 18 may be installed in the internal memory, and the downloaded program may be installed in the internal memory.

Figure 2:
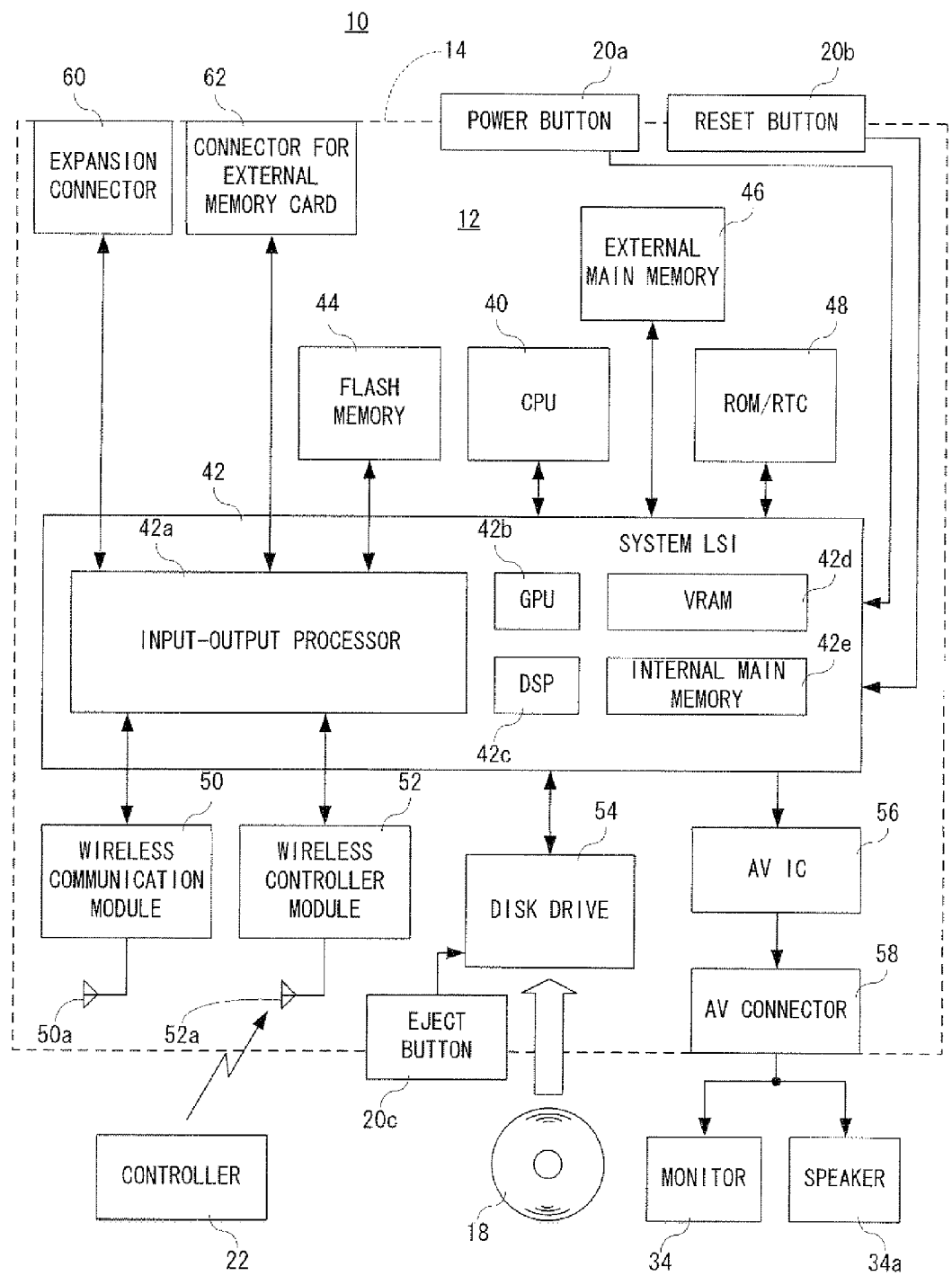
FIG. 2 is a block diagram showing an electric configuration of the game system shown in FIG. 1.

FIG. 2 is a block diagram showing an electric configuration of the game system 10 shown in FIG. 1 embodiment. Although illustration is omitted, respective components within the housing 14 are mounted on a printed board. As shown in FIG. 2, the game apparatus 12 has a CPU 40. The CPU 40 functions as a game processor. The CPU 40 is connected with a system LSI 42. The system LSI 42 is connected with an external main memory 46, a ROM/RTC 48, the disk drive 54, and an AV IC 56.

The external main memory 46 is utilized as a work area and a buffer area of the CPU 40 by storing programs like a game program, etc. and various data. The ROM/RTC 48, which is a so-called boot ROM, is incorporated with a program for activating the game apparatus 12, and is provided with a time circuit for counting a time. The disk drive 54 reads program, image data, sound data etc. from the optical disk 18, and writes them in an internal main memory 42e described later or the external main memory 46 under the control of the CPU 40.

The system LSI 42 is provided with an input-output processor 42a, a GPU (Graphics Processor Unit) 42b, a DSP (Digital Signal Processor) 42c, a VRAM 42d and an internal main memory 42e, and these are connected with one another by internal buses although illustration is omitted. The input-output processor (I/O processor) 42a executes transmission and reception of data and executes download of the data. The transmission and reception of data is described later.

The GPU 42b is made up of a part of a depicting means, and receives a graphics command (construction command) from the CPU 40 to generate game image data according to the command. Additionally, the CPU 40 applies an image generating program required for generating game image data to the GPU 42b in addition to the graphics command.

Although illustration is omitted, the GPU 42b is connected with the VRAM 42d as described above. The GPU 42b accesses the VRAM 42d to acquire data (image data: data such as polygon data, texture data, etc.) required to execute the construction command. Here, the CPU 40 writes image data required for depicting to the VRAM 42d via the GPU 42b. The GPU 42b accesses the VRAM 42d to create game image data for depicting.

In this embodiment, a case that the GPU 42b generates game image data is explained, but in a case that an arbitrary application except for the game application is executed, the GPU 42b generates image data as to the arbitrary application.

Furthermore, the DSP 42c functions as an audio processor, and generates audio data corresponding to a sound, a voice, music, or the like to be output from the speaker 34a by means of the sound data and the sound wave (tone) data stored in the internal main memory 42e and the external main memory 46.

The game image data and audio data which are generated as described above are read by the AV IC 56, and output to the monitor 34 and the speaker 34a via the AV connector 58. Accordingly, a game screen is displayed on the monitor 34, and a sound (music) necessary for the game is output from the speaker 34a.

Furthermore, the input-output processor 42a is connected with a flash memory 44, a wireless communication module 50 and a wireless controller module 52, and is also connected with an expansion connector 60 and a connector for external memory card 62. The wireless communication module 50 is connected with an antenna 50a, and the wireless controller module 52 is connected with an antenna 52a.

Although omitted in the illustration, the input-output processor 42a can communicate with other game apparatuses and various servers to be connected to a network via a wireless communication module 50. It should be noted that it is possible to directly communicate with another game apparatus without going through the network. The input-output processor 42a periodically accesses the flash memory 44 to detect the presence or absence of data (referred to as data to be transmitted) being required to be transmitted to a network, and transmits it to the network via the wireless communication module 50 and the antenna 50a in a case that data to be transmitted is present. Furthermore, the input-output processor 42a receives data (referred to as received data) transmitted from another game apparatuses via the network, the antenna 50a and the wireless communication module 50, and stores the received data in the flash memory 44. In a case that the received data does not satisfy a certain condition, the reception data is abandoned as it is. In addition, the input-output processor 42a receives data (download data) downloaded from the download server via the network, the antenna 50a and the wireless communication module 50, and stores the download data in the flash memory 44.

Furthermore, the input-output processor 42a receives input data transmitted from the controller 22 via the antenna 52a and the wireless controller module 52, and (temporarily) stores it in the buffer area of the internal main memory 42e or the external main memory 46. The input data is erased from the buffer area after being utilized in processing (information processing such as game processing, for example) by the CPU 40.

In this embodiment, as described above, the wireless controller module 52 makes communications with the controller 22 in accordance with Bluetooth standards.

In addition, the input-output processor 42a is connected with the expansion connector 60 and the connector for external memory card 62. The expansion connector 60 is a connector for interfaces, such as USB, SCSI, etc., and can be connected with medium such as an external storage and peripheral devices such as another controller different from the controller 22. Furthermore, the expansion connector 60 is connected with a cable LAN adaptor, and can utilize the cable LAN in place of the wireless communication module 50. The connector for external memory card 62 can be connected with an external storage like a memory card. Thus, the input-output processor 42a, for example, accesses the external storage via the expansion connector 60 and the connector for external memory card 62 to store and read the data.

Although a detailed description is omitted, as also shown in FIG. 1, the game apparatus 12 (housing 14) is furnished with the power button 20a, the reset button 20b, and the eject button 20c. The power button 20a is connected to the system LSI 42. When the power button 20a is turned on, the system LSI 42 is set to a mode of a normal energized state (referred to as "normal mode") in which the respective components of the game apparatus 12 are supplied with power through an AC adapter not shown. On the other hand, when the power button 20a is turned off, the system LSI 42 is set to a mode in which a part of the components of the game apparatus 12 is supplied with power, and the power consumption is reduced to minimum (hereinafter referred to as "standby mode").

In this embodiment, in a case that the standby mode is set, the system LSI 42 issues an instruction to stop supplying the power to the components except for the input-output processor 42a, the flash memory 44, the external main memory 46, the ROM/RTC 48 and the wireless communication module 50, and the wireless controller module 52. Accordingly, in this embodiment, in the standby mode, the CPU 40 never executes an application.

Although the system LSI 42 is supplied with power even in the standby mode as well, the GPU 42b, the DSP 42c and the VRAM 42d are stopped to be supplied with clocks so as not to be driven, realizing reduction in power consumption.

Although illustration is omitted, inside the housing 14 of the game apparatus 12, a fan is provided for excluding heat of the IC, such as the CPU 40, the system LSI 42, etc. to outside. In the standby mode, the fan is also stopped.

However, in a case that the standby mode is not desired to be utilized, when the power button 20a is turned off, by making the standby mode unusable, the power supply to all the circuit components are completely stopped.

The switch between the normal mode and the standby mode can be performed by turning on/off the power switch 26h of the controller 22 by a remote control operation. In the case that the remote control is not performed, electric power is set not to be supplied to the wireless controller module 52a in the standby mode.

The reset button 20b is also connected to the system LSI 42. When the reset button 20b is pushed, the system LSI 42 restarts a start-up program of the game apparatus 12. The eject button 20c is connected to the disk drive 54. When the eject button 20c is pushed, the optical disk 18 is ejected from the disk drive 54.

Figure 3:
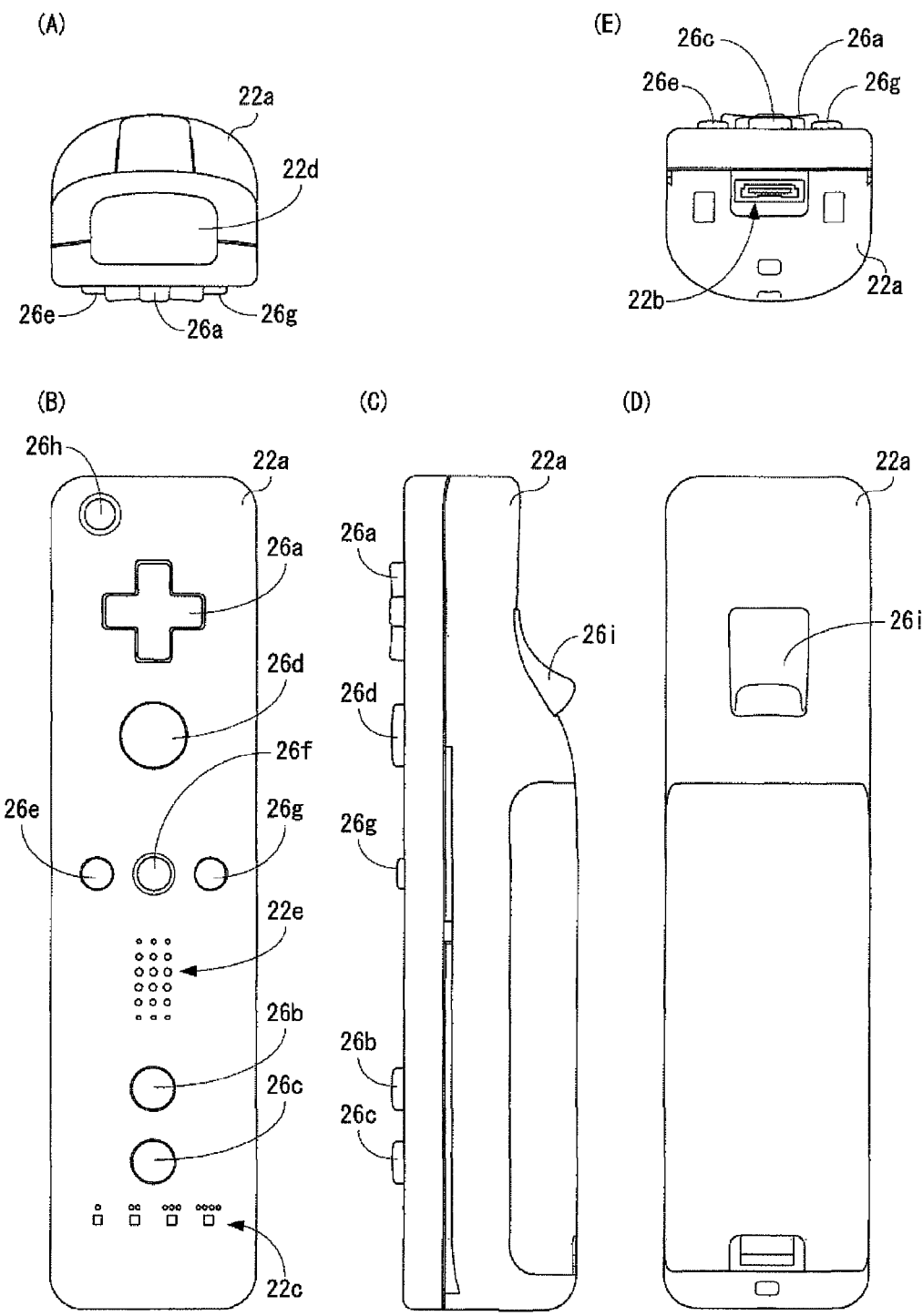
FIG. 3 is an illustrative view showing an appearance of a controller shown in FIG. 1.

Each of FIG. 3 (A) to FIG. 3 (E) shows one example of an external appearance of the controller 22. FIG. 3 (A) shows a front end surface of the controller 22, FIG. 3 (B) shows a top surface of the controller 22, FIG. 3 (C) shows a right side surface of the controller 22, FIG. 3 (D) shows a bottom surface of the controller 22, and FIG. 3 (E) shows a back end surface of the controller 22.

Referring to FIG. 3 (A) and FIG. 3 (E), the controller 22 has a housing 22a formed by plastic molding, for example. The housing 22a is formed into an approximately rectangular parallelepiped shape and has a size small enough to be held by one hand of a user. The housing 22a (controller 22) is provided with the input means (a plurality of buttons or switches) 26. Specifically, as shown in FIG. 3 (B), on a top face of the housing 22a, there are provided a cross key 26a, a 1 button 26b, a 2 button 26c, an A button 26d, a− button 26e, a HOME button 26f, a+ button 26g and a power switch 26h. Moreover, as shown in FIG. 3 (C) and FIG. 3 (D), an inclined surface is formed on a bottom surface of the housing 22a, and a B-trigger switch 26i is formed on the inclined surface.

The cross key 26a is a four-directional-push switch, including four directions of front (or upper), back (or lower), right and left operation parts indicated by arrows. By operating any one of the operation parts, it is possible to designate a moving direction of a character or object (player character or player object) that is operable by a player, designate a moving direction of a cursor, or merely designate a direction.

The 1 button 26b and the 2 button 26c are respectively push button switches, and are used for a game operation, such as adjustment of a viewpoint position and a viewpoint direction on displaying the 3D game image, i.e. a position and an image angle of a virtual camera, and the like. Alternatively, the 1 button 26b and the 2 button 26c can be used for the same operations as those of the A-button 26d and the B-trigger switch 26i or an auxiliary operation.

The A-button switch 26d is the push button switch, and is used for causing the player character or the player object to take an action other than that a directional instruction, specifically arbitrary actions, such as hitting (punching), throwing, grasping (acquiring), riding, and jumping, etc. For example, in an action game, it is possible to give an instruction to jump, punch, move a weapon, and so forth. Also, in a roll playing game (RPG) and a simulation RPG, it is possible to instruct to acquire an item, select and determine the weapon and command, and so forth. Moreover, in a case that the controller 22 is used as a pointing device, the A button switch 26d is used for deciding the icon or the button image designated by the pointer (designation image) on the game screen. For example, when the icon and the button image are decided, in response thereto, an instruction or a command which are set in advance can be input.

The − button 26e, the HOME button 26f, the + button 26g, and the power supply switch 26h are also push button switches. The − button 26e is used for selecting a game mode. The HOME button 26f is used for displaying a game menu (menu screen). The + button 26g is used for starting (restarting) or pausing the game. The power supply switch 26h is used for turning on/off a power supply of the game apparatus 12 by remote control.

In this embodiment, note that the power supply switch for turning on/off the controller 22 itself is not provided, and the controller 22 is set at on-state by operating any one of the switches or buttons of the input means 26 of the controller 22, and when not operated for a certain period of time (30 seconds, for example) or more, the controller 22 is automatically set at off-state.

The B-trigger switch 26i is also the push button switch, and is mainly used for an inputting imitating a trigger, such as shooting and designating a position selected by the controller 22. In a case that the B-trigger switch 26i is continued to be pushed, it is possible to make movements and parameters of the player object constant. In a fixed case, the B-trigger switch 26i functions in the same way as a normal B-button, and is used for canceling the action determined by the A-button 26d.

In addition, as shown in FIG. 3(E), an external expansion connector 22b is provided on a back end surface of the housing 22a, and as shown in FIG. 3 (B), an indicator 22c is provided on the top surface and at the rear of the housing 22a. The external expansion connector 22b is used for connecting an expansion controller (not illustrated) different from the controller 22, etc. The indicator 22c is made up of four LEDs, for example, and shows identification information (controller number) of the controller 22 corresponding to the lighting LED by lighting any one of the four LEDs. Furthermore, the indicator 22c shows the remaining amount of power of the controller 22 depending on the number of LEDs to be emitted.

In addition, the controller 22 has an imaged information arithmetic section 80 (see FIG. 4), and is provided with a light incident opening 22d of the imaged information arithmetic section 80 on the front end surface of the housing 22a as shown in FIG. 3 (A). Furthermore, the controller 22 has a speaker 86 (see FIG. 4), and the speaker 86 is provided inside the housing 22a at the position corresponding to a sound release hole 22e between the 1 button 26b and the HOME button 26f on the tope surface of the housing 22a as shown in FIG. 3 (B).

Note that, the shape of the controller 22 and the shape, number and setting position of each input means 26 shown in FIG. 3 (A) to FIG. 3 (E) are simply examples, and it is needless to say that even if they are suitably modified, the present invention can be realized.

Figure 4:
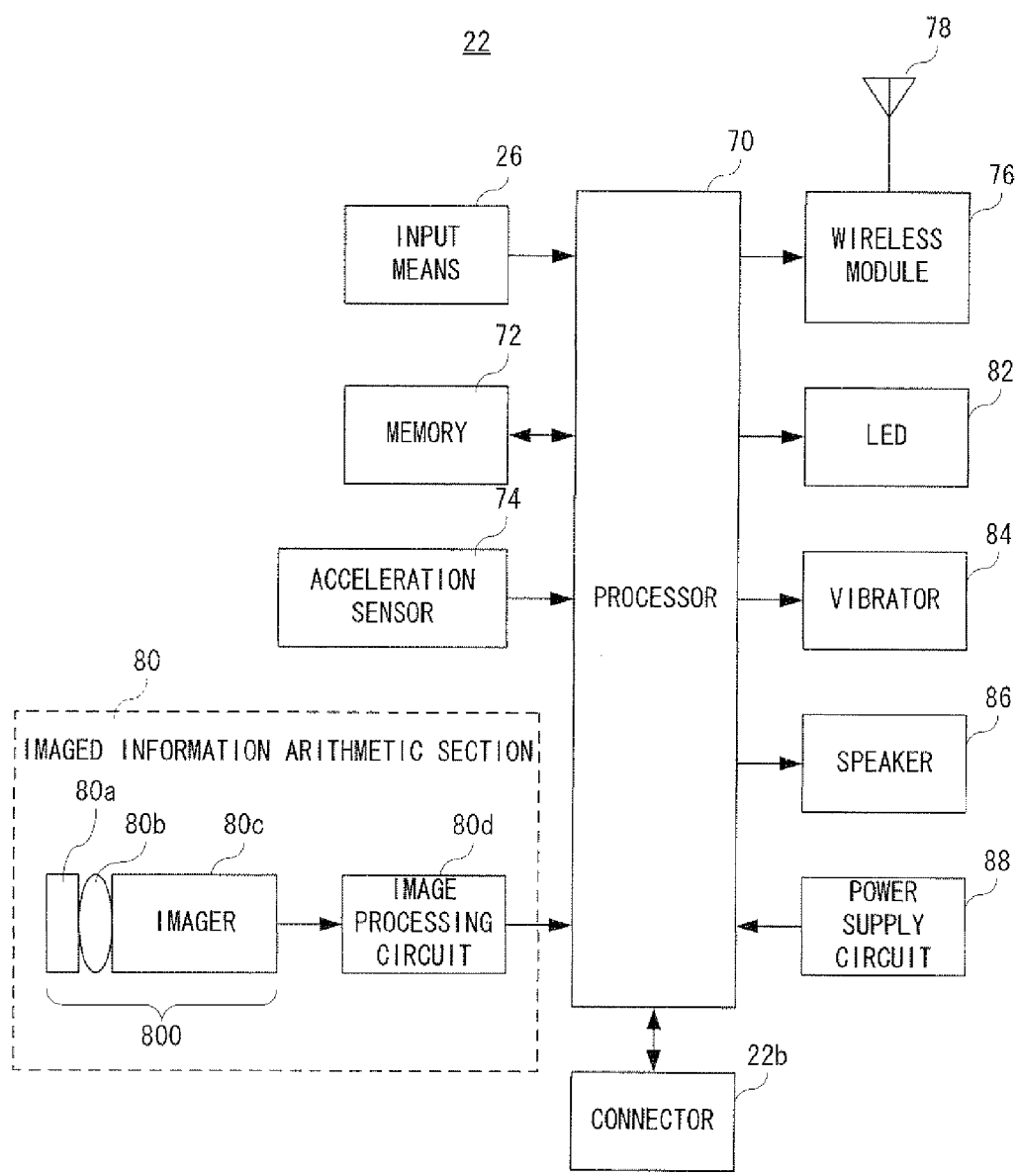
FIG. 4 is a block diagram showing an electric configuration of the controller shown in FIG. 3.

FIG. 4 is a block diagram showing an electric configuration of the controller 22. Referring to FIG. 4, the controller 22 includes a processor 70, and the processor 70 is connected with the external expansion connector 22b, the input means 26, a memory 72, an acceleration sensor 74, a wireless module 76, the imaged information arithmetic section 80, an LED 82 (the indicator 22c), a vibrator 84, a speaker 86, and a power supply circuit 88 by an internal bus (not shown). Moreover, an antenna 78 is connected to the wireless module 76.

It should be noted that although omitted in FIG. 4 for simplicity, the indicator 22c is made up of four LEDs 82 as described above.

The processor 70 is in charge of an overall control of the controller 22, and transmits (inputs) information (input information) input by the input means 26, the acceleration sensor 74, and the imaged information arithmetic section 80 as input data, to the game apparatus 12 via the wireless module 76 and the antenna 78. At this time, the processor 70 uses the memory 72 as a working area or a buffer area. An operation signal (operation data) from the aforementioned input means 26 (26a to 26i) is input to the processor 70, and the processor 70 stores the operation data once in the memory 72.

Moreover, the acceleration sensor 74 detects each acceleration of the controller 22 in directions of three axes of vertical direction (y-axial direction), lateral direction (x-axial direction), and forward and rearward directions (z-axial direction). The acceleration sensor 74 is typically an acceleration sensor of an electrostatic capacity type, but the acceleration sensor of other type may also be used.

For example, the acceleration sensor 74 detects the accelerations (ax, ay, and az) in each direction of x-axis, y-axis, z-axis for each first predetermined time, and inputs the data of the acceleration (acceleration data) thus detected to the processor 70. For example, the acceleration sensor 74 detects the acceleration in each direction of the axes in a range from −2.0 g to 2.0 g (g indicates a gravitational acceleration. The same thing can be the hereafter.) The processor 70 detects the acceleration data given from the acceleration sensor 74 for each second predetermined time, and stores it in the memory 72 once.

The processor 70 creates input data including at least one of the operation data, acceleration data and marker coordinate data as described later, and transmits the input data thus created to the game apparatus 12 for each third predetermined time (5 msec, for example).

In this embodiment, although omitted in FIG. 3 (A) to FIG. 3 (E), the acceleration sensor 74 is provided on the circuit board at a position corresponding to the place where the cross key 26a is arranged inside the housing 22a.

The wireless module 76 modulates a carrier of a predetermined frequency by the input data by using a technique of Bluetooth, for example, and emits its weak radio wave signal from the antenna 78. Namely, the input data is modulated to the weak radio wave signal by the wireless module 76 and transmitted from the antenna 78 (controller 22). The weak radio wave signal thus transmitted is received by the wireless controller module 52 provided to the aforementioned game apparatus 12. The weak radio wave thus received is subjected to demodulating and decoding processing. This makes it possible for the game apparatus 12 (CPU 40) to acquire the input data from the controller 22. Then, the CPU 40 performs processing of the application, following the obtained input data and the application program.

In addition, as described above, the controller 22 is provided with the imaged information arithmetic section 80. The imaged information arithmetic section 80 is made up of an infrared ray filter 80a, a lens 80b, an imager 80c, and an image processing circuit 80d. The infrared ray filter 80a passes only infrared rays from the light incident from the front of the controller 22. As described above, the markers 340m and 340n placed near (around) the display screen of the monitor 34 are infrared LEDs for outputting infrared lights forward the monitor 34. Accordingly, by providing the infrared ray filter 80a, it is possible to image the image of the markers 340m and 340n more accurately. The lens 80b condenses the infrared rays passing thorough the infrared ray filter 80a to emit them to the imager 80c. The imager 80c is a solid imager, such as a CMOS sensor and a CCD, for example, and images the infrared rays condensed by the lens 80b. Accordingly, the imager 80c images only the infrared rays passing through the infrared rays filter 80a to generate image data. Hereafter, the image imaged by the imager 80c is called an "imaged image". In addition, an imaging device (camera) 800 is made up of the infrared ray filter 80a, the lens 80b, and the imager 80c. The image data generated by the imager 80c is processed by the image processing circuit 80d. The image processing circuit 80d calculates a position of an object to be imaged (markers 340m and 340n) within the imaged image, and outputs each coordinate value indicative of the position to the processor 70 as imaged data (marker coordinates data described later) for each fourth predetermined time. It should be noted that a description of the process in the image processing circuit 80d is made later.

Although illustration is omitted, in a case that a power supply to the attachment device 36 is performed by the controller 22, the connector 22b and the attachment device 36 (infrared LED 366: see FIG. 10) are connected by a power cable (not illustrated). Then, under the control of the processor 70, power is supplied from the power supply circuit 88 to the attachment device 36 (infrared LED 366) or stopped.

Here, in a case that a power supply like a battery is provided to the attachment device 36, the connector 22b and the attachment device 36 need not be connected by the power cable.

Figure 5:
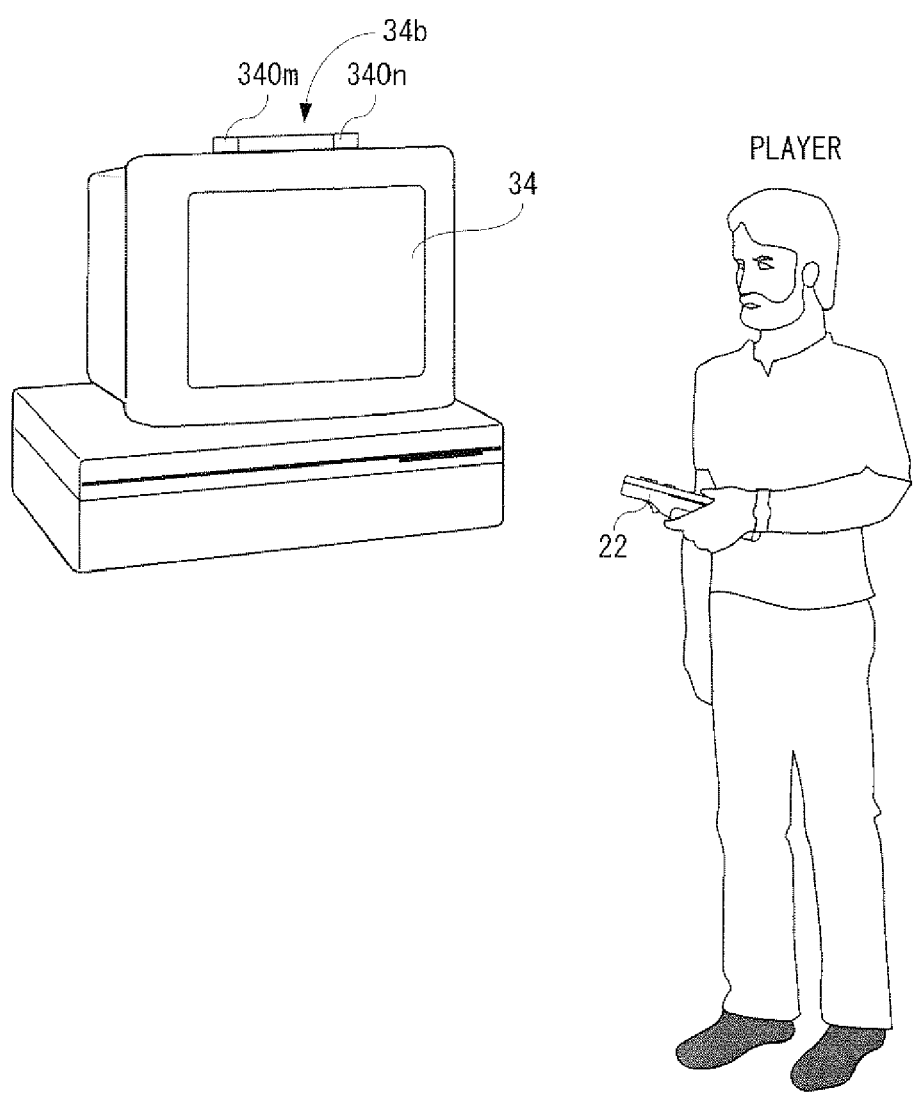
FIG. 5 is an illustrative view showing a situation in which a virtual game is played by utilizing the controller shown in FIG. 1.

FIG. 5 is an illustrative view summarizing a state when a player plays a game by utilizing the controller 22. It should be noted that this holds true for a case that another application other than the game play is executed. Here, an explanation is made on a case that the attachment device 36 is not attached to the controller 22 for convenience of explanation. As shown in FIG. 5, when playing the game by means of the controller 22 in the video game system 10, the player holds the controller 22 with one hand. Strictly speaking, the player holds the controller 22 in a state that the front end surface (the side of the incident light opening 22*d* of the light imaged by the imaged information arithmetic section 80) of the controller 22 is oriented to the markers 340*m* and 340*n*. It should be noted that as can be understood from FIG. 1, the markers 340*m* and 340*n* are placed in parallel with the horizontal direction of the screen of the monitor 34. In this state, the player performs a game operation by changing a position on the screen indicated by the controller 22, and changing a distance between the controller 22 and each of the markers 340*m* and 340*n*.

Figure 6:
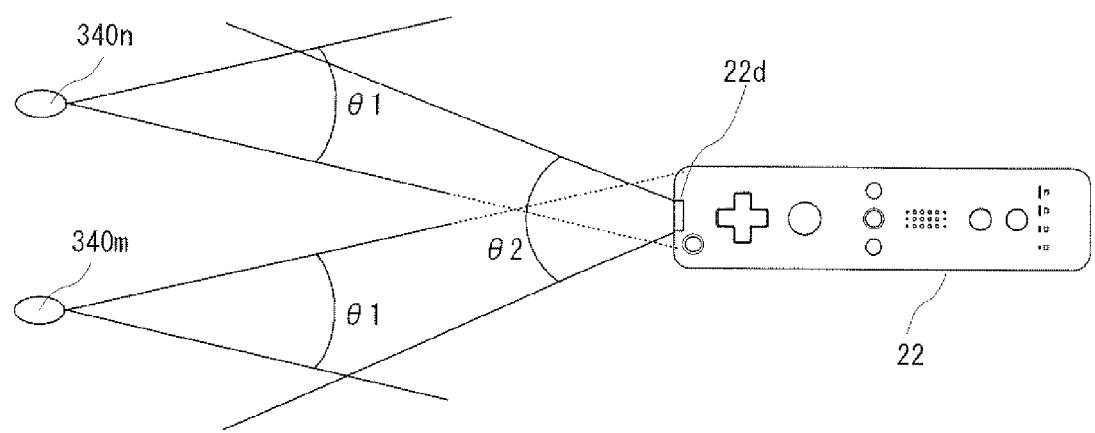
FIG. 6 is an illustrative view explaining viewing angles of the makers and the controller shown in FIG. 1.

FIG. 6 is a view showing viewing angles between the respective markers 340*m* and 340*n*, and the controller 22. As shown in FIG. 6, each of the markers 340*m* and 340*n* emits infrared ray within a range of a viewing angle $\theta 1$. Also, the imager 80*c* of the imaged information arithmetic section 80 can receive incident light within the range of the viewing angle $\theta 2$ taking the line of sight of the controller 22 as a center. For example, the viewing angle $\theta 1$ of each of the markers 340*m* and 340*n* is 34° (half-value angle) while the viewing angle $\theta 2$ of the imager 80*c* is 41°. The player holds the controller 22 such that the imager 80*c* is directed and positioned so as to receive the infrared rays from the two markers 340*m* and 340*n*. More specifically, the player holds the controller 22 such that at least one of the markers 340*m* and 340*n* exists in the viewing angle $\theta 2$ of the imager 80*c*, and the controller 22 exists in at least one of the viewing angles $\theta 1$ of the marker 340*m* or 340*n*. In this state, the controller 22 can detect at least one of the markers 340*m* and 340*n*. The player can perform a game operation by changing the position and the orientation of the controller 22 in the range satisfying the state.

If the position and the orientation of the controller 22 are out of the range, the game operation based on the position and the orientation of the controller 22 cannot be performed. Hereafter, the above-described range is called an "operable range."

Figure 7:
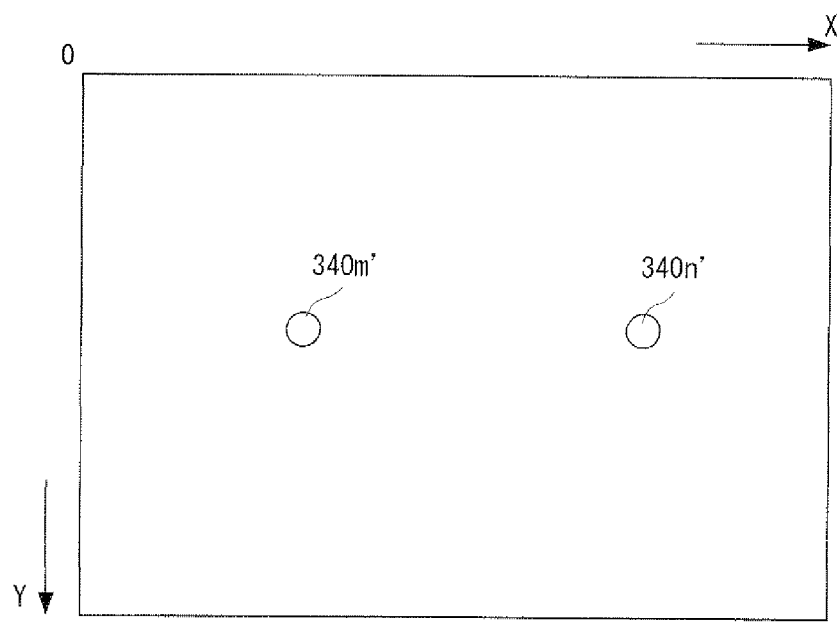
FIG. 7 is an illustrative view showing one example of an imaged image including objective images.

If the controller 22 is held within the operable range, an image of each of the markers 340*m* and 340*n* is imaged by the imaged information arithmetic section 80. That is, the imaged image obtained by the imager 80*c* includes an image (object image) of each of the markers 340*m* and 340*n* as an object to be imaged. FIG. 7 is a view showing one example of the imaged image including object images. The image processing circuit 80*d* calculates coordinates (marker coordinates) indicative of the position of each of the markers 340*m* and 340*n* in the imaged image by utilizing the image data of the imaged image including the object images.

Since the object image appears as a high-intensity part in the image data of the imaged image, the image processing circuit 80*d* first detects the high-intensity part as a candidate of the object image. Next, the image processing circuit 80*d* determines whether or not the high-intensity part is an object image on the basis of the size of the detected high-intensity part. The imaged image may include images other than the object image due to sunlight through a window and light of a fluorescent lamp in the room as well as the images 340*m*' and 340*n*' of the two markers 340*m* and 340*n* as object images. The determination processing whether or not the high-intensity part is an object image is executed for discriminating the images 340*m*' and 340*n*' as an object image from the images other than them, and accurately detecting the object image.

More specifically, in the determination process, it is determined whether or not the detected high-intensity part is within the size of the preset predetermined range. Then, if the high-intensity part is within the size of the predetermined range, it is determined that the high-intensity part represents the object image. On the contrary, if the high-intensity part is not within the size of the predetermined range, it is determined that the high-intensity part represents the images other than the object image.

In addition, as to the high-intensity part which is determined to represent the object image as a result of the above-described determination processing, the image processing circuit 80*d* calculates the position of the high-intensity part. More specifically, the barycenter position of the high-intensity part is calculated. Here, the coordinate of the barycenter position is called a "marker coordinate". Also, the barycenter position can be calculated with more detailed scale than the resolution of the imager 80*c*. Now, the resolution of the imaged image imaged by the imager 80*c* shall be 126×96, and the barycenter position shall be calculated with the scale of 1024×768. That is, the marker coordinate is represented by the integer from (0, 0) to (1024, 768).

Additionally, the position in the imaged image shall be represented by a coordinate system (XY coordinate system) taking the upper left of the imaged image as an origin point, the downward direction as an Y-axis positive direction, and the right direction as an X-axis positive direction.

Also, if the object image is correctly detected, two high-intensity parts are determined as object images by the determination processing, and therefore, two marker coordinates are calculated. The image processing circuit 80*d* outputs data indicative of the calculated two marker coordinates. The data (marker coordinate data) of the output marker coordinates is included in the input data by the processor 70 as described above, and transmitted to the game apparatus 12.

The game apparatus 12 (CPU 40) detects the marker coordinate data from the received input data to thereby calculate a designated position (designated coordinate) by the controller 22 on the screen of the monitor 34 and distances from the controller 22 to the respective markers 340*m* and 340*n* on the basis of the marker coordinate data. More specifically, from the position of the mid point of the two marker coordinates, a position to which the controller 22 faces, that is, a designated position is calculated. The distance between the object images in the imaged image is changed depending on the distance between the controller 22 and each of the markers 340*m* and 340*n*, and therefore, the game apparatus 12 can grasp the distance between the controller 22 and each of the markers 340*m* and 340*n* by calculating the distance between the two marker coordinates. In addition, from the inclination of the straight line passing through the two marker coordinates, an amount of rotation of the controller 22 when the light incident opening 22*d* of the controller 22 is turned to the markers 340*m* and 340*n* (monitor 34) can be detected with a longitudinal direction of the controller 22 as a rotation axis.

Figure 8:
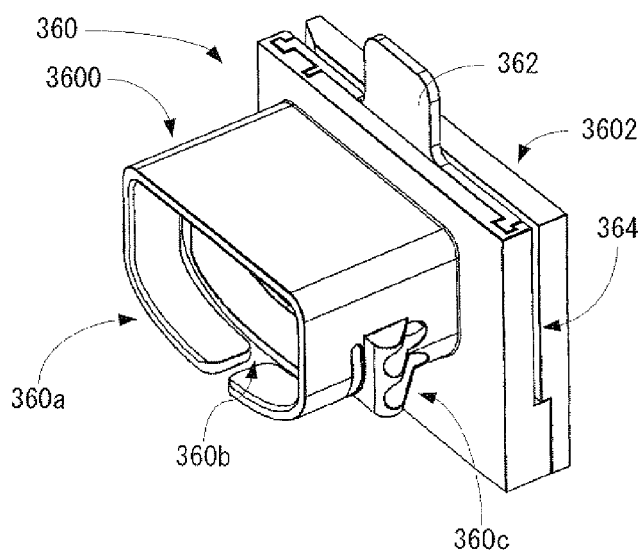
FIG. 8 is an illustrative view showing an appearance of an attachment device which can be attached to and detached from the controller shown in FIG. 1.
Figure 8:
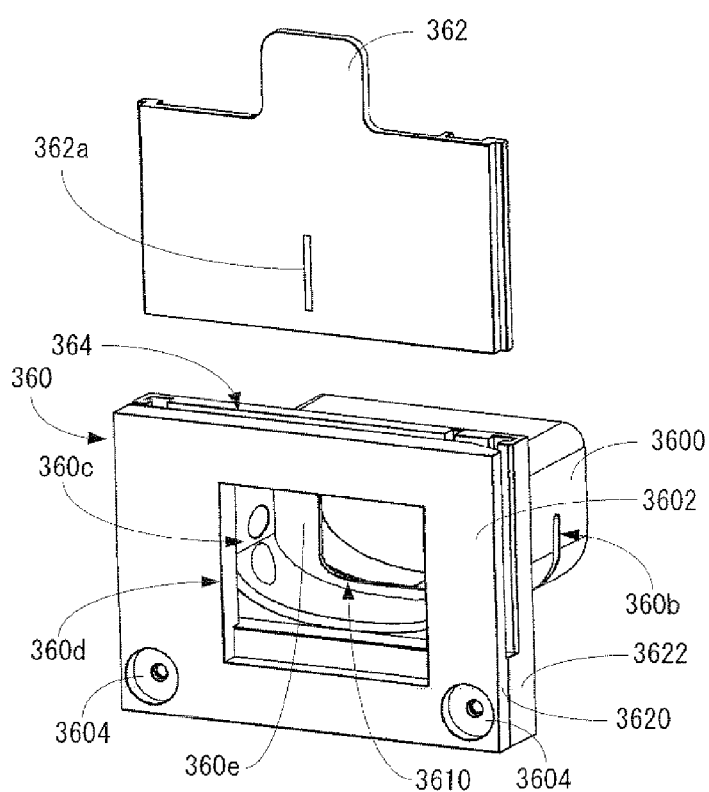

Each of FIG. 8(A) and FIG. 8(B) is an illustrative view showing an external configuration of the attachment device 36 which is provided to be attached to and detached from the controller 22. As shown in FIG. 8(A) and FIG. 8(B), the attachment device 36 is made up of a body 360 and a slit plate 362. Furthermore, the body 360 is made up of a connected portion 3600 to be connected to the controller 22 and an attaching portion 3602 for loading a slit plate 362 roughly separately. The connected portion 3600 is an approximately quadrangular cylindrical shape in cross section extending in a vertical direction to a plane of a plate member 3622 (see FIG. 8(B)) making up of the attaching portion 3602.

As shown in FIG. 8(A), an insertion port 360a to which a tip end portion of the controller 22 is to be inserted when the attachment device 36 is attached to the controller 22 is provided at the connected portion 3600 of the body 360. Furthermore, a notch 360b is provided at a part of the connected portion 3600, and when the attachment device 36 is attached to and detached from the controller 22, the insertion port 360a is expanded. This allows for easy attachment and detachment of the attachment device 36 to and from the controller 22. Furthermore, although illustration is omitted, at the tip end portion of the controller 22, an imaging device 800 is housed, and when the attachment device 36 is attached to the controller 22, the imaging device 800 is enclosed by the connected portion 3600.

Figure 9:
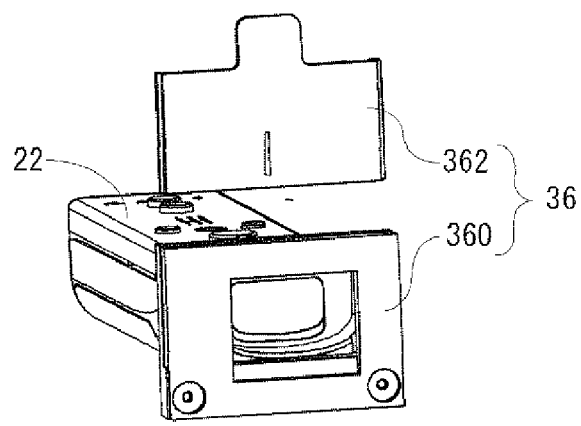
FIG. 9 is an illustrative view showing usage of the controller attached with the attachment device shown in FIG. 1.
Figure 9:
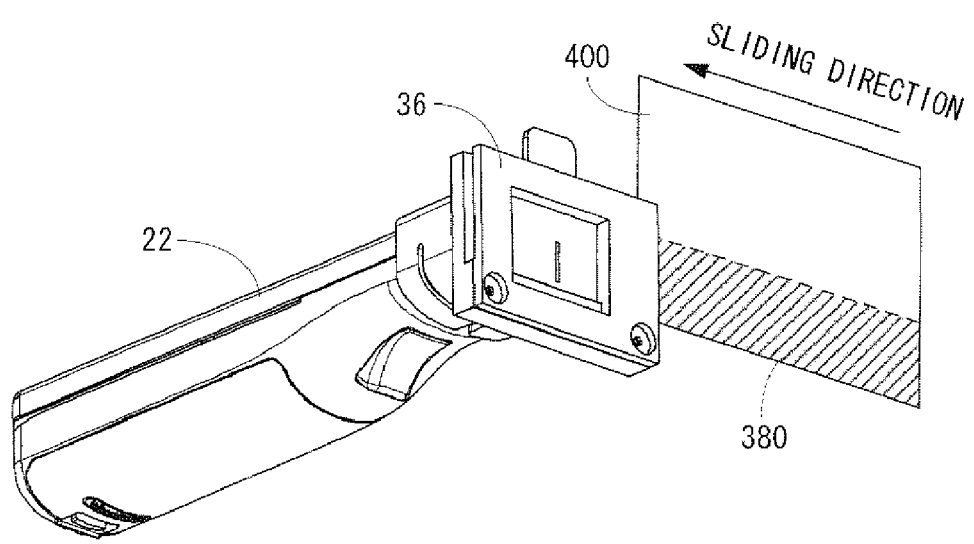

Furthermore, a guide groove 364, in a case that from an information medium like a card 400 printed or pasted with a dot pattern 380 (see FIG. 9(B)), the pattern (code) is read, for sliding the card 400 is provided to the attaching portion 3602. This is for ensuring a constant distance between the card 400 (dot pattern 380) and the controller 22 (imaging device 800), and preventing the card 400 (dot pattern 80) from being slanted with respect to the controller 22 (imaging device 800) when the card 400 is slid. Here, under certain circumstances, the card 400 may be inserted into the guide groove 364 without being slid.

Additionally, two mounting holes 360c for attaching two infrared LEDs 366 (omitted in FIG. 8) are provided on a side surface of the connected portion 3600. Although illustration is omitted, each of the infrared LEDs 366 is attached such that at least an emitting part of the infrared LED 366 is arranged inside the body 360. It should be noted that in this embodiment, since two infrared LEDs 366 are to be attached, the two mounting holes 360c are provided. That is, the number of mounting holes 360c is decided by the number of infrared LEDs 366 whereas the number of infrared LEDs 366 to be attached is decided depending on the size and shape of the range of the irradiated infrared rays (a range of irradiation of the infrared rays).

FIG. 8(B) is an illustrative view of the attachment device 36 when seen from a direction reverse to the insertion port 360a shown in FIG. 8(A). FIG. 8(B) shows the attachment device 36 with the slit plate 362 removed from the body 360 (attaching portion 3602). As shown in FIG. 8(B), the attaching portion 3602 is provided with a quadrangle through-hole 360d. Furthermore, although it is difficult to understand in the drawing, a stopper 360e having a cut-out portion 3610 approximately the same in size (shape) as the light incident opening 22d is provided inside the connected portion 3600. As shown in FIG. 8(B), the stopper 360e is provided closer to the insertion port 360a than the mounting holes 360c, and adjusts a position (movement) of the controller 22 in an inserting direction when the controller 22 is attached to the attachment device 36.

Although it is difficult to understand in the drawing, the sizes of the through-hole 360d and the cut-out portion 3610 provided to the stopper 360e are decided depending on the angle of view (see viewing angle θ2 shown in FIG. 6) of the imager 80c provided to the controller 22. Furthermore, the position of the stopper 360e is decided such that the distance between the light incident opening 22d (imager 80c) of the controller 22 and the guide groove 364 (dot pattern 380) becomes a predetermined distance. The predetermined distance, here, is a distance which allows the controller 22 to correctly recognize the high-intensity part (the above-described "object image") in the imaged image and the position of the high-intensity part in a case that a dot pattern 380 (see FIG. 10 and FIG. 11(A)) described later is imaged by the imager 80c, and decided by the size of the dot and a resolution of the imager 80c, etc.

Returning to FIG. 8(B), the attaching portion 3602 is further made up of a plate member 3620 and the plate member 3622. The plate member 3620 and the plate member 3622 are connected (pasted) by two connecting portions 3604. Although not understood in the drawing, the plate member 3622 is formed with a guide groove for loading the slit plate 362. When the slit plate 362 is loaded into the plate member 3622, the above-described guide groove 364 is formed by the plate member 3620 and the plate member 3622 loading the slit plate 362. As understood from FIG. 8(A) and FIG. 8(B) as well, the guide groove 364 is formed to extend in parallel with the plate members 3620, 3622 making up of the attaching portion 3602. In other words, the guide groove 364 is formed so as to extend in a width direction of a slit 362a.

Furthermore, at a lower center of the slit plate 362, the slit 362a is provided. The slit 362a has a vertically-long rectangular shape, and has a predetermined length and a predetermined width. Here, the predetermined length is set to a length the same extent as the vertical length of a dot pattern 380 described later (the length decided by the number of dots in a row and the size of the dot). Furthermore, the predetermined width is set to be little wider than the width of the dot in the dot pattern 380. For example, the predetermined width has a length which allows the player to read four white dots in a row even in a case that the card 400 (dot pattern 380) is slightly slanted.

Although illustration is omitted, a range at least inside (internal) of the body 360 and including the stopper 360e and the slit plate 362 and between them is blackened. Here, the entire attachment device 36 may be blackened. This is for preventing a high-intensity part other than the dot pattern 380 from being detected as described later.

As shown in FIG. 9(A), for example, in a case that the slit plate 362 is removed in a state that the attachment device 36 is attached to the controller 22, as explained by using FIG. 5-FIG. 7, the controller 22 is used for coordinate input, and etc. on the monitor 34 by imaging the two markers 340m and the marker 340n. That is, in such a case, the controller 22 can be used as a pointing device.

On the other hand, as shown in FIG. 9(B), in a case that the slit plate 362 is also loaded in a state the attachment device 36 is attached to the controller 22, by imaging a part of the dot pattern 380 printed and so forth on the card 400 which is irradiated by the infrared ray from the infrared LED 366, the controller 22 executes predetermined information processing according to the dot pattern 380. That is, in such a case, it is possible to use the controller 22 as a reading apparatus (pattern reader) which reads the dot pattern 380 (code).

It should be noted that it is difficult to understand in FIG. 9(B), the dot pattern 380 is printed and so forth on the back of the card 400 (on the side of the controller 22).

Here, a case that the controller 22 is used as a pointing device and a case that it is used as a pattern reader are switched in response to a request from the application program, such as an information processing program. For example, in the former, power is supplied from the game apparatus 12 to the markers 340m, 340n, but the power is not supplied to the infrared LED 366 from the controller 22 according to an instruction from the game apparatus 12. In the latter, power is not supplied from the game apparatus 12 to the markers 340m, 340n, but power is supplied from the controller 22 to the infrared LED 366 according to an instruction from the game apparatus 12.

It should be noted that in a case that a battery is attached to the attachment device 36, provided is a switch mechanism (not illustrated) in which when the slit plate 362 is loaded into the attachment device 36, power is supplied to the infrared LED 366, and when the slit plate 362 is removed from the attachment device 36, power supplied to the infrared LED 366 is stopped, and whereby, the controller 22 may be used as a pointing device or a pattern reader as described above.

This makes it possible to stop power supply when the markers 340m, 340n or the infrared LED 366 is not used and reduce useless electric power consumption.

Figure 10:
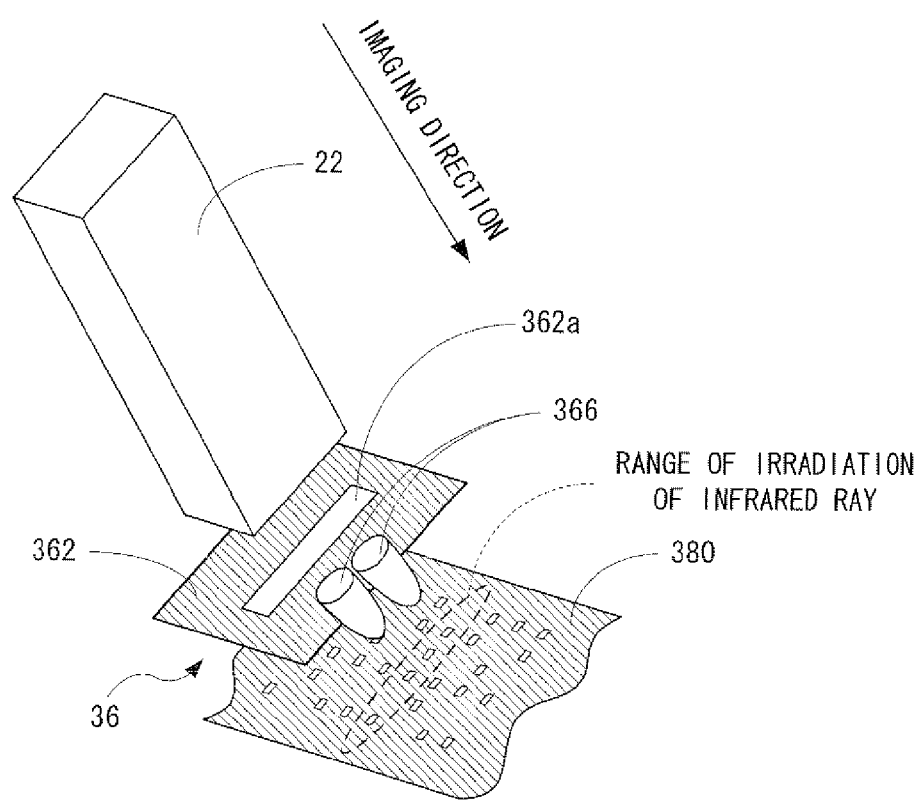
FIG. 10 is an illustrative view showing a method of reading a dot pattern in a case that the controller attached with the attachment device is used as a pattern reader in the game system.

For example, in a case that the controller 22 is used as a pattern reader, as to the controller 22 attached with the attachment device 36, the card 400 printed and so forth with the dot pattern 380 is slid along the guide groove 364 by the user or the player as shown in FIG. 9(B). Here, as shown in FIG. 10, as to the attachment device 36, an infrared ray is output to a side opposite of the controller 22 and toward the position opposed to the slit 362a provided to the slit plate 362. As understood from FIG. 10, when the dot pattern 380 is read, the slit 362a (slit plate 362) is arranged between the controller 22 (light incident opening 22d) and the dot pattern 380 (card 400). Here, for clear understanding in FIG. 10, the body 360 of the attachment device 36 is omitted, and only a part of the slit plate 362 and the infrared LED 366 are shown. Actually, the slit plate 362 including the slit 362a and the infrared LED 366 are surrounded by the body 360. Furthermore, in FIG. 10, in order to clearly show the slit plate 362 and the dot pattern 380, they are slanted in place of being blackened.

Accordingly, as described above, in a case that the card 400 is slid along the guide groove 364, infrared ray is irradiated onto a part of the dot pattern 380 (a range of irradiation of the infrared ray) printed and so forth on the card 400. Here, in this embodiment, a part or the entire of the slit plate 362 and the background of the dot pattern 380 are blackened, by the blackened part, infrared ray from the infrared LED 366 is absorbed to make only the white dot high-intensity, and detection of the high-intensity part other than high-intensity part detected through the slit 362a can be prevented. That is, erroneous detection can be prevented.

Figure 11:
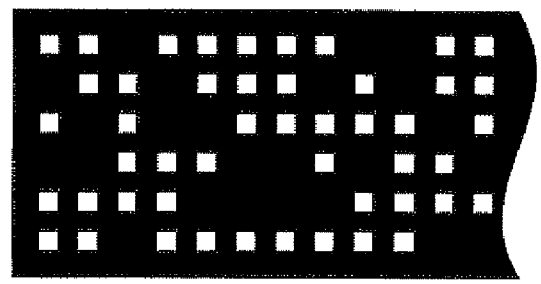
FIG. 11 is an illustrative view showing a dot pattern and a conceptual diagram when the dot pattern is read.
Figure 11:
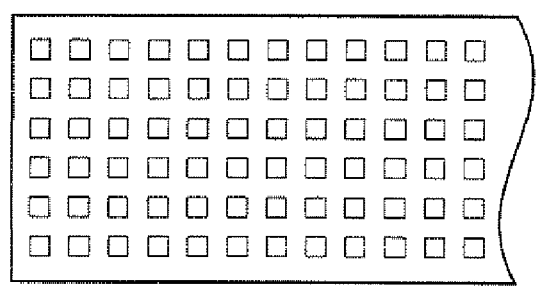
Figure 11:
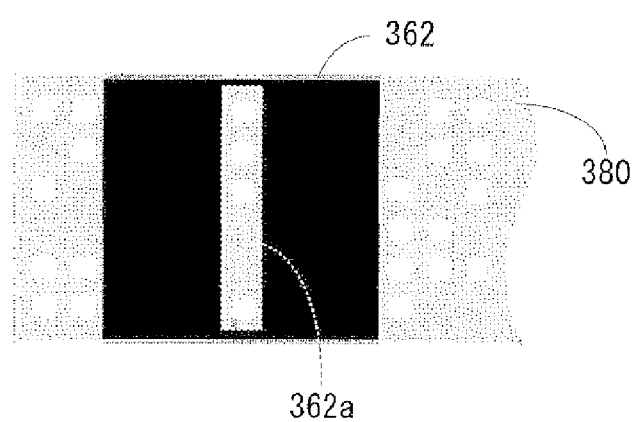

Here, the dot pattern 380 is represented by drawing a plurality of white dots in the black background as shown in FIG. 11(A). It should be noted that as shown in FIG. 11(B), the vertical length of the dot pattern 380 is a length capable of being aligned with six dots, and out of the six dots, white is given to any four and black is given to the rest of the two dots. Accordingly, the two black dots are indistinguishable from the background.

It should be noted that the dot pattern 380 can be set by the developer or the programmer of the application program who uses such a dot pattern 380.

For example, a piece of information can be given by four white dots arranged in a row in a longitudinal direction. Here, by recognizing the entire portion of the dot pattern 380, that is, by detecting the positions of the white dots in all the rows included in the dot pattern 380, the game apparatus 12 can execute the above-described predetermined information processing on the basis of the recognized dot pattern 380.

For example, as to the controller 22, imaging processing by the imaging device 800 is executed every certain period of time (one frame), and coordinates (positions) of the four high-intensity parts are detected from the one imaged image. Input data including coordinate data as to all the rows of the dot pattern 380 (corresponds to the above-described "marker coordinate data") is transmitted to the game apparatus 12. Thus, as described above, on the side of the game apparatus 12, predetermined information processing is executed on the basis of the dot pattern 380. Here, as described above, the input data is transmitted to the game apparatus 12 for each third predetermined time, and thus, the coordinate data of all the rows of the dot pattern 380 may be separately transmitted.

Here, the frame is a unit of time (1/60 seconds) for updating the screen, such as a game screen, etc.

It should be noted that in FIG. 11(B), in order to clearly show the dot, the black of the background and the dots are omitted, and circumferences of each dot are shown by a solid line.

Furthermore, the dot pattern 380 has a vertical length capable of being aligned with seven or more dots. In addition, in each row, a piece of information is given to white four dots, but the number of white dots may be equal to or more than five if only it is equal to or more than one. That is, it is possible to provide information not only by the positions of the dots but also the positions and the number of the dots. Here, by the number of high-intensity parts (dots) which can be processed by the imaged information arithmetic section 80 at a time, the maximum number of the white dots to be displayed in each row is decided.

In addition, in this embodiment, the slit 362a is formed in a vertically long shape, and therefore, one information is given for each row in the dot pattern 380, but in a case that the width of the slit 362a is widened or in a case that the orientation of the slit 362a is changed, the dot pattern 380 is required to be formed such that one information may be given by a plurality of rows, or information is given by lines. This is a matter of the design, and by attaching the controller 22 to the attachment device 36, the controller 22 is used as a pattern reader should be noted.

Thus, as shown in FIG. 9(B) and FIG. 10, in a case that the dot pattern 380 printed and so forth on the card 400 is read, four white dots are detected as a high-intensity part for each row through the slit 362a provided to the slit plate 362 as shown in FIG. 11(C). More specifically, the position of the high-intensity part (marker coordinate) is detected from the image which is imaged for each frame. Here, in FIG. 11(C), in order to clearly show the slit 362 and the dot pattern 380, the background of the dot pattern 380 and a part of the dots are represented in gray, but they are actually black as described above.

According to this embodiment, by attaching the attachment device to the controller with the imaging device, the controller can be used as a pointing device and a pattern reader.

Figure 12:
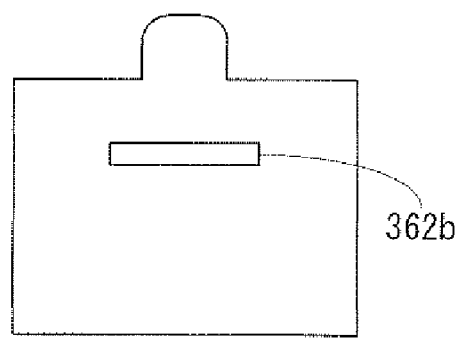
FIG. 12 is an illustrative view showing another example of a slit plate used for the attachment device.
Figure 12:
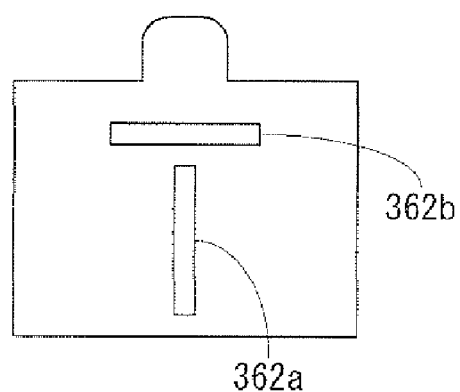

Additionally, in this embodiment, a vertically long slit is provided to the slit plate, but it is not required to be restricted thereto. As shown in FIG. 12(A), a horizontally long slit 362b may be provided. Here, in such a case, the arrangement of the infrared LEDs have to be changed. Although illustration is omitted, a slit which is slanted from the vertical direction or from the horizontal direction may be provided.

In addition, the slit is not required to be restricted to one. For example, as shown in FIG. 12(B), a vertically-long slit 362a and a horizontally-long slit 362b may be provided. In such a case, infrared LEDs have to be arranged so as to irradiate positions being opposed to the two slits. Moreover, in such a case, on the basis of information read from the respective slits, different information processing may be executed. Here, the number of slits and the shape are not required to be restricted to those in the illustration.

Additionally, in this embodiment, the attachment device is provided to be attached to and detached from the controller, but the controller incorporated with the attachment device may be used.

Furthermore, in this embodiment, the dot pattern printed and so forth on the card is read, but there is no need of being restricted thereto. The dot pattern which is placed to a magazine and displayed on the game screen (monitor) may be read. In such a case, by moving the controller in a two-dimensional direction (left, right, up, down, oblique) in a state that the controller attached with the attachment device is pressed against the magazine or the game screen which displays a dot pattern so as to be in contact therewith, the dot pattern may be read, for example.

Moreover, in this embodiment, the dot which is intended to make high-intensity is given white, but colors other than black may be given because the infrared ray is not absorbed therein.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An information processing system having an input device, an attachment device provided to be attached to and detached from said input device, and an information processing apparatus to execute predetermined information processing by performing communications with said input device, said input device comprising:

an imaging device;

a position calculator which calculates a position of a high-intensity part within an image imaged by said imaging device; and a transmitter which transmits data in relation to the position of at least said high-intensity part;

said attachment device comprising:

a cover which covers the imaging device and has a slit of a predetermined width, said information processing apparatus comprising:

a receiver which receives the data transmitted by said transmitter; and an executor which executes predetermined information processing on the basis of the data received by said receiver.

2. An information processing system according to claim 1, wherein said attachment device further comprises an illuminator which emits light toward a imaging direction of said imaging device.

3. An information processing system according to claim 1, wherein said attachment device further comprises a guide member extending in a width direction of said slit.

4. An information processing system according to claim 1, wherein said attachment device is detachably provided with a plate member including said slit.

5. An attachment device to be attached to an input device having an imaging device, comprising:

a plate member having a slit of a predetermined width;

an illuminator which outputs an infrared ray in a direction intersecting with a surface of said plate member from outside of said plate member;

a guide member which extends in parallel with said plate member; and a cover which is formed to cover said imaging device, said plate member and said illuminator.

6. An information processing system according to claim 5, wherein said plate member and said cover are blackened.

* * * * *